United States Patent [19]

Ishii et al.

[11] Patent Number: 4,912,320
[45] Date of Patent: Mar. 27, 1990

[54] OPTICAL TYPE ENCODER INCLUDING DIFFRACTION GRATING FOR PRODUCING INTERFERENCE FRINGES THAT ARE PROCESSED TO MEASURE DISPLACEMENT

[75] Inventors: Satoshi Ishii, Tokyo; Tetsuharu Nishimura, Kawasaki; Koh Ishizuka, Urawa; Masaaki Tsukiji, Tokyo, all of Japan

[73] Assignee: Canon Kabushiki Kaisha, Tokyo, Japan

[21] Appl. No.: 321,155

[22] Filed: Mar. 9, 1989

[30] Foreign Application Priority Data

Mar. 11, 1988 [JP] Japan .................... 63-057865

[51] Int. Cl.$^4$ .......................... G01D 5/34; G01J 1/32
[52] U.S. Cl. ............................ 250/231.13; 250/205
[58] Field of Search ........... 250/205, 231 SE, 237 G; 324/174; 356/395; 340/347 P; 33/125 C

[56] References Cited

U.S. PATENT DOCUMENTS 4,360,730 11/1982 Breslow .................. 250/231 SE
4,823,001 4/1989 Kobayashi et al. ........ 250/231 SE
4,829,342 5/1989 Nishimura .................. 250/237 G Primary Examiner—David C. Nelms
Assistant Examiner—William L. Oen
Attorney, Agent, or Firm—Fitzpatarick, Cella, Harper & Scinto

[57] ABSTRACT

An optical type encoder comprises a light source for supplying a light beam for illuminating a diffraction grating formed on a movable scale, photoelectric converting means for photoelectrically converting interference fringes formed by causing a plurality of diffracted lights created by the diffraction grating to interfere with one another to measure the displacement of the movable scale and outputting a predetermined signal, detecting means for receiving a predetermined diffracted light created by the diffraction grating and detecting any fluctuation of the intensity thereof, and control means for modulating the intensity of the light beam illuminating the diffraction grating, on the basis of a signal from the detecting means, so that the amplitude of the output signal from the photoelectric converting means may become substantially constant.

7 Claims, 3 Drawing Sheets

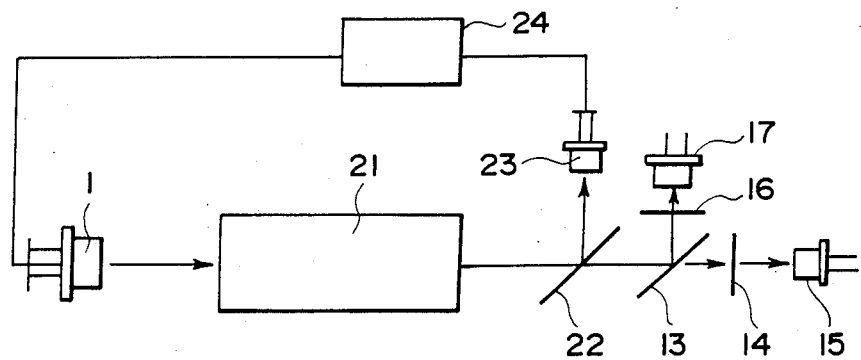
F I G. 1
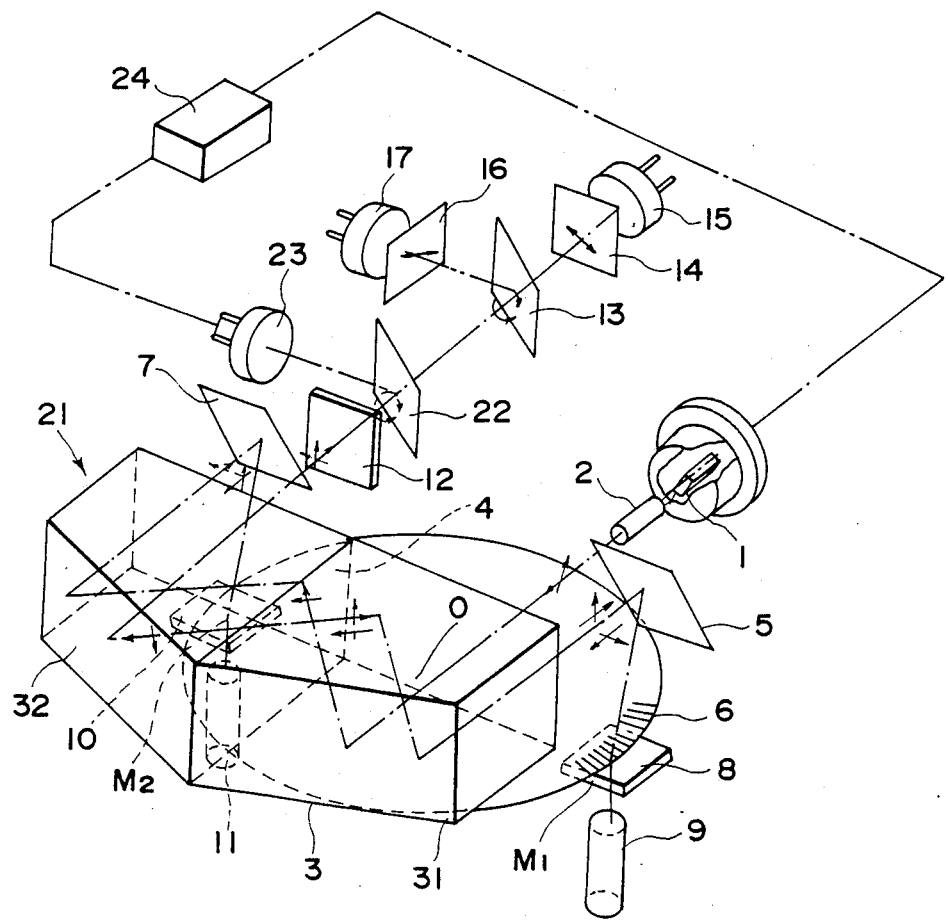
F I G. 2

OPTICAL TYPE ENCODER INCLUDING DIFFRACTION GRATING FOR PRODUCING INTERFERENCE FRINGES THAT ARE PROCESSED TO MEASURE DISPLACEMENT

BACKGROUND OF THE INVENTION

1. Field of the Invention

This invention relates to an optical type encoder, and in particular to an optical type encoder in which a light is projected onto an optical type scale on which a diffraction grating is formed and interference fringes obtained by causing a plurality of diffracted lights created by the optical type scale to interfere with one another are photoelectrically converted to thereby measure the displacement of the optical type scale.

2. Related Background Art

In recent years, in precision machines such as NC machine tools and semiconductor printing apparatuses, there has been required a precise measuring machine which can measure the displacement of a movable member such as a stage in the unit of 1 μm or less (submicron).

In Japanese Laid-Open Pat. Application No. 62-193922 and Japanese Laid-Open Pat. Application No. 62-193923 filed by the Applicant, there are proposed optical type encoders using a coherent light beam and a diffraction grating to detect the displacement of an optical type scale highly accurately.

In the apparatuses of these publications, a laser beam from a laser is divided into a plurality of light beams, and these light beams are caused to enter the diffraction grating of an optical type scale connected to a rotating object or a rectilinearly moving object, and interference fringes obtained by causing a plurality of diffracted lights created by said diffraction grating to interfere with one another are photoelectrically detected by photoelectric converting means, thereby finding the displacement of the optical type scale, i.e., the displacement of the moving object, highly accurately.

In this case, it is important for accomplishing highly accurate measurement to construct the apparatus so that the amplitude of the output signal from the photoelectric converting means may always be constant, but since the output value from the laser (the intensity of the laser light) fluctuates due to the manufacturing error of the diffraction grating of the optical type scale or to a change in the environment around the laser, it has been difficult to obtain an output signal of a predetermined amplitude from the photoelectric converting means. Accordingly, with the prior-art optical type encoder, the displacement of the optical type scale could not be measured highly accurately.

SUMMARY OF THE INVENTION

The present invention has been made in view of the above-noted problems peculiar to the prior art and an object thereof is to provide an optical type encoder which can measure the displacement of an optical type scale highly accurately.

To achieve the above object, the optical type encoder of the present invention has a light source for supplying a light beam for illuminating a diffraction grating formed on a movable scale, photoelectric converting means for photoelectrically converting interference fringes formed by causing a plurality of diffracted lights created by said diffraction grating to interfere with one another to measure the displacement of said scale and outputting a predetermined signal, detecting means for receiving a predetermined diffracted light created by said diffraction grating and detecting any fluctuation of the intensity thereof, and control means for modulating the intensity of the light beam illuminating said diffraction grating, on the basis of a signal from said detecting means, so that the amplitude of the output signal from said photoelectric converting means may be substantially constant.

Since the present invention has said detecting means and said control means, the amplitude of the periodical signal from said photoelectric converting means whose output level varies in response to the displacement of the scale can be made constant and thus, it becomes possible to measure the displacement of the scale highly accurately. Accordingly, the problem that the measurement accuracy is deteriorated due to the fluctuation of the output of the light source or to the manufacturing error of the diffraction grating can be eliminated.

Specific forms and other features of the present invention will be shown in detail in some embodiments thereof which will hereinafter be described.

BRIEF DESCRIPTION OF THE DRAWINGS

FIG. 1 is a schematic block diagram of the essential portions of the optical type encoder of the present invention.

FIG. 2 is a schematic view showing an embodiment of the present invention as it is applied to a rotary encoder.

DESCRIPTION OF THE PREFERRED EMBODIMENTS

Figure 3:
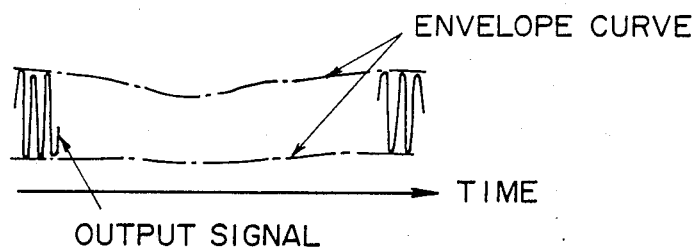
FIG. 3 illustrates an output signal obtained in a prior-art rotary encoder.

Referring to FIG. 1 which is a schematic block diagram of the essential portions of the optical type encoder of the present invention, the reference numeral 1 designates a light source for supplying a light beam for illuminating a diffraction grating formed on an optical type scale, and the reference numerals 15 and 17 denote photoelectric converting means for photoelectrically converting interference fringes formed by causing a plurality of diffracted lights created by the diffraction grating to interfere with one another. The photoelectric converting means 15 and 17 each comprise a light receiving element. The reference numeral 23 designates detecting means for receiving a predetermined diffracted light created by the diffraction grating and detecting the fluctuation of the intensity thereof. The detecting means 23 comprises a light receiving element. The reference numeral 24 denotes control means for modulating the intensity of the light beam for illuminating the diffraction grating, in conformity with a signal from the detecting means (the light receiving element). The reference numeral 21 designates an optical system for applying the light beam from the light source 1 to a predetermined location on the optical type scale (the diffraction grating) and superposing a plurality of diffracted lights created by the diffraction grating one upon another, the reference numerals 13 and 22 denote beam splitters provided to direct the diffracted lights to the light receiving elements 15, 17 and 23, and the reference numerals 14 and 16 designate polarizing plates.

FIG. 2 shows an example of the specific construction of the optical system 21 in FIG. 1, and more particularly shows an embodiment of the present invention as it is applied to a rotary encoder.

Referring to FIG. 2, the reference numeral 1 designates a light source comprising a semiconductor laser, the reference numeral 2 denotes a collimator lens for collimating a divergent light beam emitted from the light source 1, the reference numeral 3 designates an optical part comprising two trapezoidal prisms 31 and 32 cemented together, and the reference numeral 4 denotes the light dividing surface of the optical part 3 which comprises the cemented surface of the prisms 31 and 32. The light dividing surface 4 has the same function as that of a polarizing beam splitter, and divides the incident light beam into a P-polarized component and an S-polarized component. The reference numerals 5 and 7 designate reflecting mirrors, the reference numeral 6 denotes an amplification type diffraction grating (a radial diffraction grating having grating lines radially of a scale) provided on a rotatable scale as a rotating object to be measured, and the reference numerals 8 and 10 designate quarter wavelength plates. The reference numerals 9 and 11 denote reflecting means each comprising, for example, a cat's eye optical system. The reference numeral 12 designates a quarter wavelength plate, the reference numeral 13 denotes a half-mirror, the reference numerals 14 and 16 designate polarizing plates, and the reference numerals 15 and 17 denote light receiving elements. The letter O designates the center of the rotatable scale, and $M_1$ and $M_2$ denote points symmetrical with respect to the center O of the diffraction grating 6.

In the present embodiment, the laser beam emitted from the light source 1 is collimated by the collimator lens 2, whereafter it is caused to enter the optical part 3 and is reflected by the inclined surface of the trapezoidal prism 31 forming the optical part 3, and is caused to enter the light dividing surface 4 at a predetermined angle. The light beam which has entered the light dividing surface 4 is divided into two rectilinearly polarized light beams, i.e., a reflected light beam (S-polarized component) and a transmitted light beam (P-polarized component) substantially at a ratio of 1:1. Here, the laser beam emitted from the light source 1 is a rectilinearly polarized light polarized in a direction inclined at 45° with respect to the orthogonal polarization azimuth of the light dividing surface 4.

The two light beams divided by the light dividing surface 4 are reflected twice each in the trapezoidal prisms 31 and 32, emerge from the optical part 3 and are incident on the predetermined locations $M_1$ and $M_2$ on the diffraction grating 6 at a predetermined angle by the reflecting mirrors 5 and 7. Of the transmitted diffracted lights diffracted at the locations $M_1$ and $M_2$ on the diffraction grating 6, diffracted lights of a particular order are reflected by the reflecting means 9 and 11 through the quarter wavelength plates 8 and 10, and are caused to travel back along the same optical path. The diffracted lights are then caused to be again incident on the locations $M_1$ and $M_2$ on the diffraction grating 6. The diffracted lights of the particular order again diffracted at the locations $M_1$ and $M_2$ are reflected by the reflecting mirrors 5 and 7 and are caused to travel back along the same optical path, and are caused to enter the optical part 3 and are caused to repeat internal reflection in the optical part 3, and are directed to the light dividing surface 4. The re-diffracted lights arriving at the light dividing surface 4 pass twice through the quarter wavelength plates before and after they are reflected by the reflecting means 9 and 11 and therefore, the polarization azimuths thereof differ by 90° each from those before they enter the diffraction grating 6. Accordingly, the light beam first reflected by the light dividing surface 4 is now transmitted therethrough and the light beam first transmitted through the light dividing surface 4 is now reflected thereby, and these light beams overlap each other. The light beams which have thus overlapped each other are internally reflected in the optical part 3 and emerge from the optical part 3, and enter the quarter wavelength plate 12. The light beam which has passed through the quarter wavelength plate 12 is formed by two diffracted lights which have become circularly polarized lights of the opposite directions.

Part of this light beam is reflected by the half-mirror 22 and enters the light receiving element 23, and the rest of the light beam is transmitted through the half-mirror 22. The light beam transmitted through the half-mirror 22 is divided into two light beams by the half-mirror 13, and the two light beams enter the light receiving elements 15 and 17 as rectilinearly polarized lights through the polarizing plates 14 and 16 disposed with their polarization azimuths made different from each other by 45°. The light receiving elements 15 and 17 photoelectrically convert interference fringes (monochromatic) formed by the incident light beams. Periodical signals of two phases having a phase difference of 90° conforming to the azimuths of the polarizing plates 14 and 16 are obtained from the light receiving elements 15 and 17. These periodical signals of two phases are signals whose output level changes in response to the rotation of the scale (diffraction grating). When the scale is rotated by an amount corresponding to one pitch of the diffraction grating 6, the phase of the mth-order re-diffracted light created at the location $M_1$ varies by $2m\pi$. Likewise, the phase of nth-order diffracted light re-diffracted at the location $M_2$ on the diffraction grating 6 varies by $2n\pi$. Thereby, as a whole, $(2m-2n)$ sine wave signals are obtained from the light receiving elements 15 and 17. In the present embodiment, the sine wave signals at this time are detected, whereby the amount of rotation of the diffraction grating 6 is measured.

For example, assuming that the grating pitch of the diffraction grating 6 is 3.2 μm and 1st-order and −1st-order are utilized as the diffracted lights obtained from the locations $M_1$ and $M_2$, four sine waveforms are obtained from the light receiving elements 15 and 17 when the rotatable scale is rotated by an amount corresponding to 3.2 μm which is one pitch. That is, ¼ of one pitch of the diffraction grating, i.e., 3.2/4=0.8 μm, is obtained as a resolving power per sine waveform.

In the present embodiment, a phase difference of 90° is provided between the signals from the light receiving elements 15 and 17, whereby the direction of rotation of the rotatable scale can be discriminated.

If only the amount of rotation is to be measured, the half-mirror 13, the polarizing plates 14 and 16 and one of the light receiving means 15 and 17 are unnecessary. Also, by measuring the frequency of the sine wave signal, the speed of rotation of a rotating object can also be found easily.

In the present embodiment, the diffracted lights from the two locations $M_1$ and $M_2$ substantially point-symmetrical with respect to the center O are utilized to form interference fringes, and the measurement error resulting from the eccentricity of the center of rotation of a rotating object such as the rotary shaft of a motor from the center O of the scale is reduced.

Now, in a system which is not provided with the light receiving element 23 and the control means 24 as in the prior art, where the diffraction efficiency of the diffraction grating 6 differs due to a manufacturing error or the like, or where a semiconductor laser is used as the light source 1, if the output (intensity) of the laser light fluctuates with a change in the ambient temperature of the laser, the amplitude of the output signals from the light receiving elements 15 and 17 changes as shown in FIG. 3.

Figure 4:
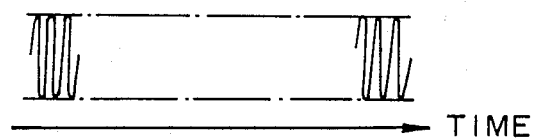
FIG. 4 illustrates an output signal obtained in the rotary encoder of FIG. 2.

In contrast, in the present embodiment, design is made such that part of the light beam resulting from re-diffracted lights overlapping each other through the half-mirror 22 is received by the monitoring light receiving element 23 and the quantity of output light from the light source 1 (the intensity of the laser light) is controlled by the control means 24 on the basis of the output signal from the light receiving element 23 and therefore, the output signals from the light receiving elements 15 and 17 become signals which are always substantially constant in amplitude as shown in FIG. 4. Accordingly, the amount of rotation of the scale can be measured accurately.

Description will now be made of an embodiment in which the quantity of output light of the light source 1 is controlled by the control means 24.

FIGS. 5 to 8 are circuit diagrams showing several circuits for controlling of quantity of output light from the light source 1 by the control means 24.

Figure 5:
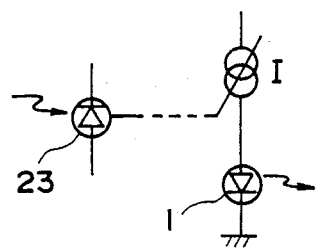
FIGS. 5, 6, 7 and 8 are circuit diagrams showing several circuits for controlling the quantity of light of the light beam from a light source.

In FIG. 5, an electric current I is supplied to the light source 1 to thereby cause the light source 1 to emit light. At this time, the electric current I is controlled by the magnitude of the photocurrent of the monitoring light receiving element 23. That is, design is made such that when the quantity of light entering the light receiving element 23 increases, the electric current I is reduced to thereby decrease the intensity of the laser light and that when the quantity of light entering the light receiving element 23 decreases, the electric current I is increased to thereby increase the laser light.

By such design, the quantity of light entering the polarizing plates 14 and 16 before the light receiving elements 15 and 17 is always kept at a predetermined intensity and accordingly, sine wave signals of constant amplitude as shown in FIG. 4 can be taken out from the light receiving elements 15 and 17.

Figure 6:
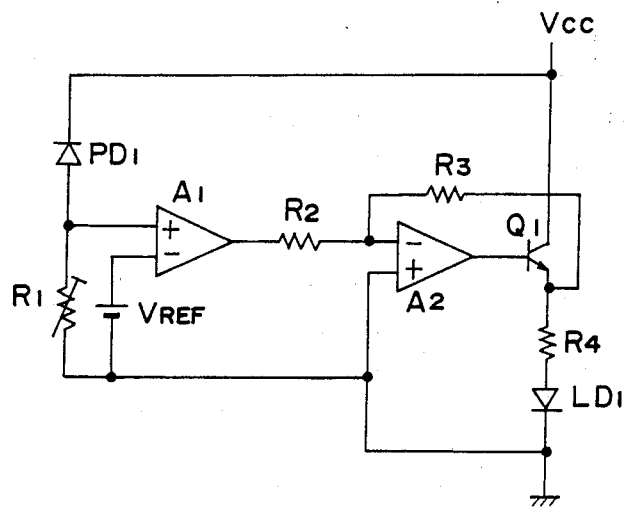

FIG. 6 shows an embodiment for controlling the electric current I flowing to the light source 1. In FIG. 6, $A_1$ and $A_2$ designate operational amplifiers, $Q_1$ denotes a transistor, $PD_1$ designates a monitoring light receiving element (23), $LD_1$ denotes a light source (1), and $R_1$-$R_4$ designate resistors. $V_{REF}$ denotes a reference voltage, and $V_{CC}$ designates a power source. A voltage produced in the resistor $R_1$ by a photocurrent produced by the light receiving element $PD_1$ is amplified by the operational amplifier $A_1$. The operational amplifier $A_2$, the transistor $Q_1$ and the resistors $R_2$ and $R_3$ together constitute an inverting amplifier which amplifies the output of the operational amplifier $A_1$. When the quantity of the monitoring light increases, the electric current of the light receiving element $PD_1$ increases and the output of the operational amplifier $A_1$ rises and conversely the output of the operational amplifier $A_2$ falls.

Accordingly, the electric current flowing through the resistor $R_4$ and the light source $LD_1$ decreases to thereby decrease the intensity of the laser light. Conversely, when the quantity of the monitoring light decreases, the output of the operational amplifier $A_2$ rises to thereby increase the electric current flowing through the light source 1 and increase the intensity of the laser light. Thus, the electric current flowing through the light source 1 is controlled so that the quantity of the monitoring light is always constant, and the amplitudes of the signal waveforms from the light receiving elements 15 and 17 are stabilized as shown in FIG. 4. In the case of this example, the amplification degree of the operational amplifier $A_1$ is usually very great and therefore, the non-inverting input terminal of the operational amplifier $A_1$ becomes stable at substantially the same voltage as $V_{REF}$. That is, it becomes stable at a quantity of light for which the current of the light receiving element $PD_1$ is $V_{REF}/R_1$. Accordingly, in the present embodiment, design is made such that by making the resistor $R_1$ variable, the intensity of the diffracted light can be adjusted, and optimization of the brightness of the interference fringes is achieved by adjusting means comprising this variable resistor $R_1$.

Figure 7:
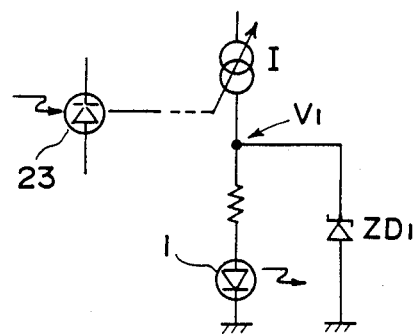

In the above-described embodiment, if the monitoring light entering the light receiving element $PD_1$ is cut off for some reason or other or the resistor $R_1$ is assuming an extremely small value, there will be the possibility that the circuit attempts to supply a greater electric current to the light source $LD_1$ to thereby destroy the light source $LD_1$. Accordingly, for example, it is preferable to provide such compensating means that as shown in FIG. 7, the voltage $V_1$ does not assume a certain value or more. In such case, the voltage $V_1$ is limited by the Zener voltage of a constant voltage diode $ZC_1$.

Figure 8:
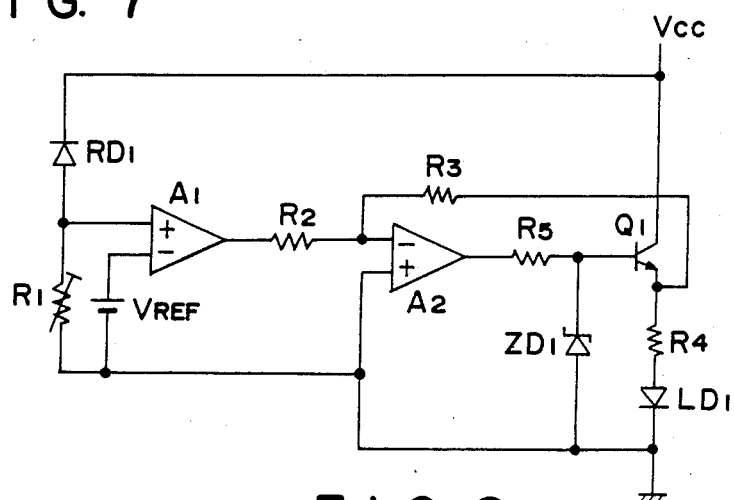

FIG. 8 is a circuit diagram showing the circuit of FIG. 7 as it is applied to the circuit of FIG. 6. In this case, if the constant voltage diode $ZD_1$ is directly connected to the emitter of the transistor $Q_1$, there will be the undesirable possibility that a great current flows from the transistor $Q_1$ to the constant voltage diode $ZD_1$ and therefore, the constant voltage diode $ZD_1$ is connected to the base of the transistor $Q_1$. As shown, a resistor $R_5$ and the constant voltage diode $ZD_1$ are connected, and the base voltage of the transistor $Q_1$ is limited by the Zener voltage of the constant voltage diode $ZD_1$ to thereby prevent the destruction of the light source.

The present optical type encoder can read various types of optical type scales. In the above-described embodiment, there is shown a rotatable scale in which an amplitude type diffraction grating is formed along the circumferential direction (the direction of rotation), but use can also be made of a scale in which a phase type diffraction grating is formed as the diffraction grating. Also, the present optical type encoder can read not only a rotatable scale but also a linear scale and therefore, the present invention can also be applied to a linear encoder.

Also, by using a single-mode or multimode semiconductor laser as the light source 1, there can be provided a compact optical type encoder.

In the above-described embodiment, part of the diffracted light used for the formation of interference fringes is received by the light receiving element 23 to thereby detect the fluctuation of the intensity of the diffracted light from the scale, but in the present invention, other diffracted light emerging from the scale can also be received with the diffracted light used for the formation of interference fringes to thereby modulate the intensity of the light beam illuminating the diffraction grating of the scale.

As described above, there are various forms of the present invention, but in any form, according to the present invention, the optical type encoder has detecting means for detecting any fluctuation of the intensity of a predetermined diffracted light created by the diffraction grating of the scale and control means for modulating the intensity of the light beam illuminating the diffraction grating on the basis of the signal from said detecting means, whereby it can make substantially constant the amplitude of the output signal from the photoelectric converting means photoelectrically converting the interference fringes and thus, it becomes possible to measure the displacement of the scale highly accurately. Also, the optical type encoder of high accuracy and high resolving power provided by the present invention is very effective as the displacement measuring system of precision instruments such as various machine tools and exposure apparatuses for the manufacture of semiconductors.

We claim:

1. An optical type encoder comprising:
   a light source for supplying a light beam for illuminating a diffraction grating formed on a movable scale;
   photoelectric converting means for photoelectrically converting interference fringes formed by causing a plurality of diffracted lights created by said diffraction grating to interfere with one another to measure the displacement of said movable scale and outputting a predetermined signal;
   detecting means for receiving a predetermined diffracted light created by said diffraction grating and detecting any fluctuation of the intensity thereof; and
   control means for modulating the intensity of the light beam illuminating said diffraction grating, on the basis of a signal from said detecting means, so that the amplitude of the output signal from said photoelectric converting means may become substantially constant.

2. An optical type encoder according to claim 1, wherein said detecting means receives part of the diffracted lights forming said interference fringes through a beam splitter provided in the optical path of said diffracted lights.

3. An optical type encoder according to claim 1, wherein said control means controls the quantity of output light of said light source.

4. An optical type encoder according to claim 3, wherein said light source comprises a semiconductor laser.

5. An optical type encoder according to claim 1, wherein said control means has adjusting means for adjusting the brightness of said interference fringes.

6. A displacement measuring apparatus for measuring the displacement of a movable diffraction grating, comprising:
   means for illuminating said diffraction grating by a light beam;
   means for photoelectrically converting interference fringes formed by a plurality of diffracted lights emitted from said diffraction grating; and
   means for modulating the intensity of the light beam illuminating said diffraction grating, on the basis of the fluctuation of the intensity of a predetermined diffracted light emitted from said diffraction grating.

7. An optical type encoder comprising:
   a semiconductor laser;
   means for directing the laser light from said laser to a diffraction grating formed on a movable scale;
   means for causing a plurality of diffracted lights created by said diffraction grating to interfere with one another to thereby form interference fringes;
   first light receiving means for photoelectrically converting said interference fringes and outputting a predetermined signal;
   second light receiving means for receiving a predetermined diffracted light created by said diffraction grating and outputting a signal conforming to the intensity of said diffracted light; and
   means for controlling the level of an electric current for driving said semiconductor laser, on the basis of the output signal from said second light receiving means, so that the amplitude of the output signal from said first light receiving means may become substantially constant.

* * * * *

UNITED STATES PATENT AND TRADEMARK OFFICE
CERTIFICATE OF CORRECTION

PATENT NO. : 4,912,320

DATED : March 27, 1990

INVENTOR(S) : Satoshi Ishii, et al

It is certified that error appears in the above-identified patent and that said Letters Patent is hereby corrected as shown below:

On the title page;

Attorney, Agent, or Firm,
"Fitzpatarick, Cella, Harper & Scinto"
should read --Fitzpatrick, Cella, Harper & Scinto--.

Signed and Sealed this

Seventh Day of July, 1992

Attest:

DOUGLAS B. COMER

Attesting Officer

Acting Commissioner of Patents and Trademarks